United States Patent
Lang et al.

(10) Patent No.: US 10,604,062 B2
(45) Date of Patent: Mar. 31, 2020

(54) HEADLIGHT ADJUSTING SYSTEM COMPRISING GYROSCOPES

(71) Applicant: Bayerische Motoren Werke Aktiengesellschaft, Munich (DE)

(72) Inventors: Andreas Lang, Groebenzell (DE); Thomas Hagenreiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/497,294

(22) Filed: Apr. 26, 2017

(65) Prior Publication Data

US 2017/0225610 A1     Aug. 10, 2017

Related U.S. Application Data

(63) Continuation of application No. PCT/EP2015/077116, filed on Nov. 19, 2015.

(30) Foreign Application Priority Data

Dec. 10, 2014   (DE) .................. 10 2014 225 344

(51) Int. Cl.
*B60Q 1/00*     (2006.01)
*B60Q 1/115*    (2006.01)
*F21S 41/657*   (2018.01)

(52) U.S. Cl.
CPC .......... *B60Q 1/115* (2013.01); *B60Q 1/0023* (2013.01); *F21S 41/657* (2018.01); *B60Q 2200/38* (2013.01); *B60Q 2300/056* (2013.01); *B60Q 2300/132* (2013.01)

(58) Field of Classification Search
CPC .................. B60Q 1/10–124; F21S 41/657
See application file for complete search history.

(56) References Cited

U.S. PATENT DOCUMENTS

| | | | | |
|---|---|---|---|---|
| 6,142,655 A * | 11/2000 | Zillgitt | ................ | B60Q 1/0023 362/466 |
| 2012/0106179 A1* | 5/2012 | Kasaba | ................ | B60Q 1/115 362/465 |
| 2013/0148369 A1* | 6/2013 | Haest | .................... | B60Q 1/076 362/475 |

(Continued)

FOREIGN PATENT DOCUMENTS

| CN | 202923475 U | 5/2013 |
|---|---|---|
| CN | 103764445 A | 4/2014 |

(Continued)

OTHER PUBLICATIONS

International Search Report (PCT/ISA/210) issued in PCT Application No. PCT/EP2015/077116 dated Feb. 15, 2016 with English translation (Four (4) pages).

(Continued)

*Primary Examiner* — Gerald J Sufleta, II
(74) *Attorney, Agent, or Firm* — Crowell & Moring LLP

(57) ABSTRACT

A motor vehicle has a headlight, a first position sensor for outputting first position information, a second position sensor for outputting second position information, and an actuating system which is configured to adjust a light distribution generated by the headlight as a function of the first and second position information.

12 Claims, 3 Drawing Sheets

(56) References Cited

U.S. PATENT DOCUMENTS

| | | | | |
|---|---|---|---|---|
| 2014/0301094 A1* | 10/2014 | Ehlgen | ............... | B60Q 1/115 362/466 |
| 2015/0081168 A1* | 3/2015 | McWithey | ............ | B60Q 1/115 701/36 |
| 2015/0239391 A1* | 8/2015 | Foltin | ............... | G06K 9/00798 701/49 |

FOREIGN PATENT DOCUMENTS

| | | |
|---|---|---|
| DE | 197 20 314 A1 | 11/1998 |
| DE | 10 2008 003 707 A1 | 7/2009 |
| DE | 10 2008 040 684 A1 | 1/2010 |
| DE | 10 2011 106 178 A1 | 1/2013 |
| EP | 2 871 094 A1 | 5/2015 |
| FR | 2 915 283 A1 | 10/2008 |
| FR | 2 915 283 B1 | 3/2010 |

OTHER PUBLICATIONS

German-language Written Opinion (PCT/ISA/237) issued in PCT Application No. PCT/EP2015/077116 dated Feb. 15, 2016 (Five (5) pages).

German-language Search Report issued in counterpart German Application No. 10 2014 225 344.6 dated Oct. 29, 2015 with partial English translation (Eleven (11) pages).

Chinese-language Office Action issued in counterpart Chinese Application No. 201580044809.7 dated Jul. 2, 2018 with English translation (15 pages).

\* cited by examiner

HEADLIGHT ADJUSTING SYSTEM COMPRISING GYROSCOPES

CROSS REFERENCE TO RELATED APPLICATIONS

This application is a continuation of PCT International Application No. PCT/EP2015/077116, filed Nov. 19, 2015, which claims priority under 35 U.S.C. § 119 from German Patent Application No. 10 2014 225 344.6, filed Dec. 10, 2014, the entire disclosures of which are herein expressly incorporated by reference.

BACKGROUND AND SUMMARY OF THE INVENTION

Motor vehicles are known which are equipped with an automatic headlight range adjustment for the headlights. In this case, for example, a change of the headlight light distribution caused by a special loading or acceleration of the motor vehicle is automatically corrected.

It is now an object of the invention to provide an improved motor vehicle.

This and other objects are achieved by a motor vehicle in accordance with embodiments of the invention.

The invention is therefore based on the idea of equipping a motor vehicle with at least one headlight, with at least a first position sensor for outputting first position information, with at least a second position sensor for outputting second position information and with an actuating system, particularly a control system. The control system is configured for adjusting a light distribution, particularly a low-beam light distribution, generated by the headlight, as a function of first and second position information.

For this purpose, the actuating system preferably includes a control unit and/or a processor device, which are configured such that a light distribution, particularly a low-beam light distribution, generated by the headlight is adjusted as a function of first and second position information.

With respect to the hardware, the actuating systems may be an actuating system, which is known per se, for a headlight range adjustment, known per se, which, with respect to programming, is configured for implementing the invention.

Studies, on which the invention is based, have revealed that, despite the initially mentioned headlight range adjustment, known motor vehicles have a sub-optimally adjusted light distribution and, as a result, blind other traffic participants.

Further comprehensive studies have revealed that the causes of the above are position changes of the headlight, particularly of the low-beam light module, relative to the vehicle body, such as the vehicle body shell, the chassis and/or the vehicle occupant compartment. In this case, these position changes occur only after the mounting of the headlights and after an optimal first adjustment of the headlight light distribution (initialization, initial headlight adjustment), for example, in the vehicle assembly plant, in the delivery facility or in the workshop, and are, for example, caused by thermal or age-related material changes of the headlight and/or of the installation environment of the headlight.

As a result of the invention, by way of a first position sensor, the position of the installation environment of the headlight, of the headlight itself or of a headlight component can be detected, and by way of a second position sensor, the position of the motor vehicle or a motor vehicle component can be determined.

The above-mentioned unintended position change of the headlight or of a headlight component, which occurs after an optimal first adjustment of the headlight light distribution, relative to the position of the motor vehicle, particularly of the vehicle body, can thereby be detected and can be completely or partially corrected or compensated by way of a correspondingly configured actuating system.

Naturally, the invention also includes motor vehicles with several headlights and several first and/or second position sensors. Particularly preferably, it is provided that, in addition to the position sensors, further sensors, such as ABS sensors, wheel speed sensors, level sensors, pitch angle sensors or a speed sensor, are coupled with the actuating system, and corresponding sensor signals are also taken into account when adjusting the light distribution generated by the headlight or headlights.

In this case, the first position sensor is preferably placed closer to a headlight, particularly closer to a light source of the headlight than the second position sensor.

Particularly preferably, it is provided that the first position sensor is placed on the headlight or is carried by the headlight.

In a variant, the headlight has a low-beam light module, wherein the first position sensor is preferably placed on the low-beam light module or is carried by the low-beam light module, in particular, is indirectly or directly carried by a reflector or a lens of the low-beam light module.

The closer the first position sensor is arranged to the light source or to an optical element of the headlight or of the low-beam light module, the more of the above-mentioned unintended position changes can be detected by that sensor.

In contrast it is advantageous for the second position sensor to not be placed on the headlight and to not be carried by the headlight or its components. The second position sensor is preferably placed on the vehicle body, for example, on the vehicle body shell, on the chassis or on the vehicle occupant compartment, or is indirectly or directly carried by these.

As a result, the above-mentioned unintended position changes of the headlight, of the low-beam light module or of an optical element of the headlight can be determined relative to the position change of the vehicle body and can be corrected by the actuating system.

It is a further development of the invention that the first and/or the second position sensor for determining the position or the position change in space include a gyroscope, particularly a gyro instrument or a gyrocompass.

Another further development of the invention provides that the actuating system includes a control unit, particularly a processor device, which is configured for converting first and second position information and, if applicable, further information, to actuating information.

The actuating system preferably also includes an actuator unit, which is configured for adjusting a light distribution, particularly a low-beam light distribution, generated by the headlight, particularly by the low-beam light module, as a function of the actuating information.

The actuator unit may, for example, include a multiphase motor, which is appropriately configured and is coupled with the headlight, particularly the low-beam light module, in order to swivel or rotate the headlight, particularly the low-beam light module, vertically, particularly about a horizontal swivel axis, for adjusting the light distribution.

In a preferred embodiment, the first position information includes information relative to the position of the vehicle body, and information concerning the position of the headlight, particularly of the low-beam light module, relative to the vehicle body. The first position information preferably includes information concerning the position change of the vehicle body and information concerning the position change of the headlight, particularly of the low-beam light module, particularly relative to the vehicle body. Changes of the vehicle body as well as changes of the position of the headlight preferably result in changes of the first position information.

In a preferred embodiment, the second position information includes information concerning the position of the vehicle body, but preferably no information concerning the position of the headlight, particularly the low-beam light module, relative to the vehicle body. The second position information preferably includes information concerning the position change of the vehicle body but preferably no information concerning the position change of the headlight, particularly the low-beam light module, relative to the vehicle body.

It is a further development of the invention that the actuating system for adjusting a light distribution, particularly a low-beam light distribution, generated by the headlight, particularly the low-beam light module, is configured such that position changes of the headlight, particularly of the low-beam light module, of a reflector of the low-beam light module or of a lens of the low-beam light module, relative to the vehicle body, are reduced, particularly compensated, as a function of first and second position information. The correction or compensation preferably takes place based on a difference between the first and second position information.

First and/or second position information preferably each include position direction information, particularly in a plane parallel to the longitudinal axis of the vehicle and orthogonal with respect to the transverse axis of the vehicle. Position direction information includes, for example, a slope vector or a slope angle.

Particularly preferably, it is provided that the first position information represents a first angle of slope and the second position information represents a second angle of slope. The angles of slope are situated in a plane, which is parallel to the longitudinal axis of the vehicle, and which is orthogonal to the transverse axis of the vehicle. The actuating system for adjusting a light distribution, particularly a low-beam light distribution, generated by the headlight, particularly by the low-beam light module, as a function of the first position information and of the second position information, is configured such that the difference between the first and second angle of slope, as a rule, is essentially kept constant. Naturally, special situations are contemplated in which the difference between the first and the second angle of slope is essentially as a rule not kept constant, for example, when the light distribution is manually adjusted by the user or in the shop.

Preferably the position information, particularly the position direction information or the angles of slope, are initialized in the case of an appropriate, particularly a specified, compulsory or legally conformant adjustment of the light distribution, particularly the low-beam light distribution. For example, the initialization of the position information takes place within the scope of the motor vehicle production, particularly immediately after or during an appropriate first adjustment of the light distribution.

The motor vehicle preferably has a pitch angle detection system for the output of pitch angle information, particularly of the pitch attitude or of the pitch angle, of the vehicle body relative to the street level. The actuating system is configured for adjusting a light distribution generated by the headlight, as a function of first and second position information and of pitch angle information.

The actuating system for adjusting a light distribution, particularly a low-beam light distribution, generated by the headlight, particularly the low-beam light module, is then preferably configured such that, in addition, position changes of the vehicle body relative to the level of the street are compensated, particularly as a function of pitch angle information.

For this purpose, the pitch angle detection system has at least two level sensors (forward and rearward) for the detection of the forward and the rearward level, respectively, of the vehicle body with respect to the forward vehicle axle and the rearward vehicle axle, respectively.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
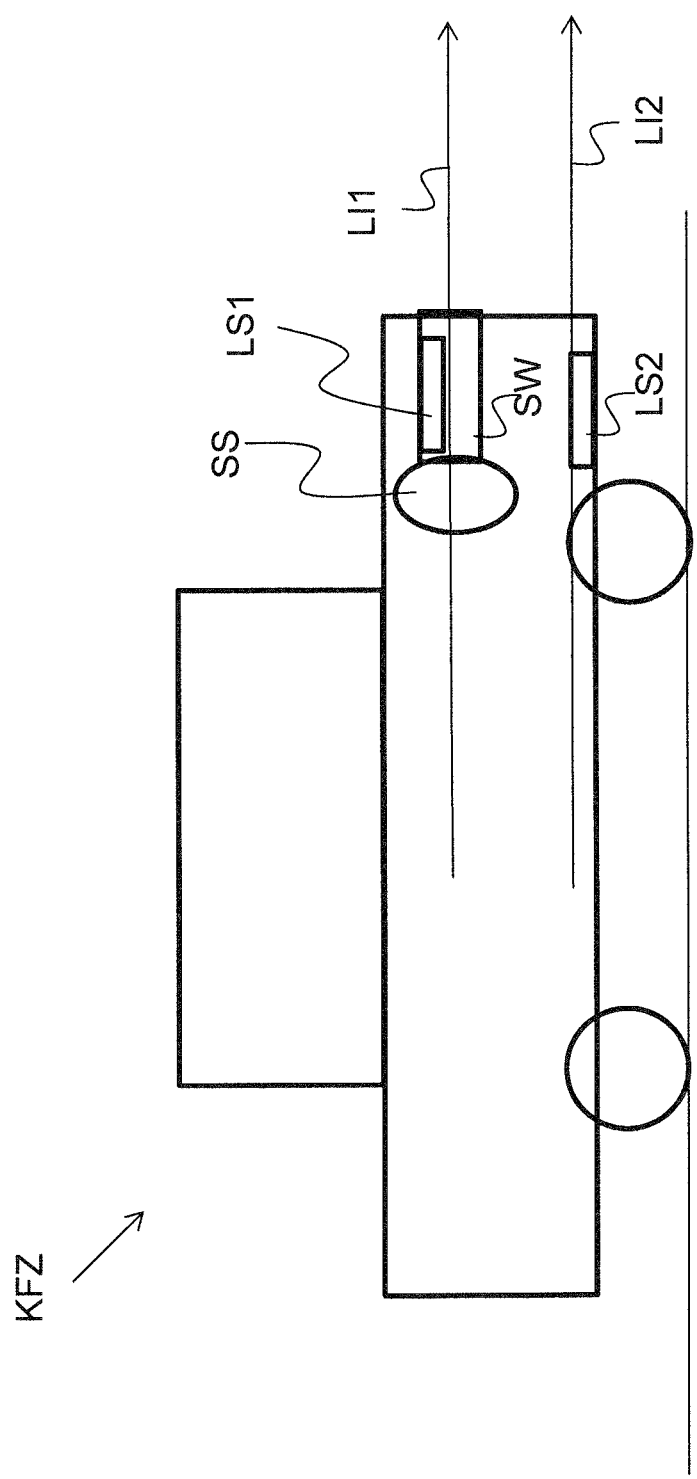
FIG. 1 is a first simplified schematic lateral function representation of a motor vehicle.

FIG. 1 shows a motor vehicle KFZ after delivery with a correctly adjusted headlight light distribution. The motor vehicle KFZ includes a headlight SW with a low-beam light module, which can be swiveled about a swivel axis, which is not shown and which preferably extends essentially parallel to the transverse axis of the vehicle, in order to adjust the light distribution generated by the headlight SW in the vertical direction.

As an alternative, it is provided that the headlight itself is not swivelable but rather includes a low-beam light module, which is not shown and which can be swiveled about a swivel axis, which is not shown and which preferably extends essentially parallel to the transverse axis of the vehicle, in order to adjust the light distribution, particularly the low-beam light distribution, generated by the low-beam light module in the vertical direction. As a result, the light-dark cutoff of the low-beam light distribution can be adjusted corresponding to legislative specifications.

For generating the low-beam light distribution, the low-beam light module has a housing and/or a support, a light source, a reflector and/or a lens.

A first position sensor LS1 comprising a gyroscope is fastened to the headlight SW, particularly to the low-beam light module, in order to detect the position, particularly the position changes of the headlight SW, particularly of the low-beam light module, in space. This position information LI1 includes preferably an angle of slope (or an angle of slope change) or a position direction (or a position direction change) in a plane, which is parallel to the longitudinal axis of the vehicle and/or orthogonal with respect to the transverse axis of the vehicle.

A second position sensor LS2 comprising a gyroscope is fastened to the vehicle body, in order to detect the position, particularly the position changes of the vehicle body in space. This position information LI2 preferably includes an angle of slope (or an angle of slope change) or a position direction (or a position direction change) in a plane which is parallel to the longitudinal axis of the vehicle and/or orthogonal with respect to the transverse axis of the vehicle.

The second position sensor LS2 preferably is a reference position sensor LS2. The change of the position of the first position sensor LS1 relative to the position of the reference position sensor LS2 is important for the appropriate adjustment of the light distribution. The reason is that this change of position of the first position sensor LS1 relative to the position of the reference position sensor LS2 represents the unintended position changes of the headlight SW or of the low-beam light module caused by mechanical stress, aging processes or thermal effects.

In contrast, as a result of this combination of the position sensor LS1 and the reference position sensor LS2, position changes caused, for example, by the terrain or the roadway, which are detected equally by both position sensors LS1, LS2, may not be considered when adjusting the light distribution.

Figure 3:
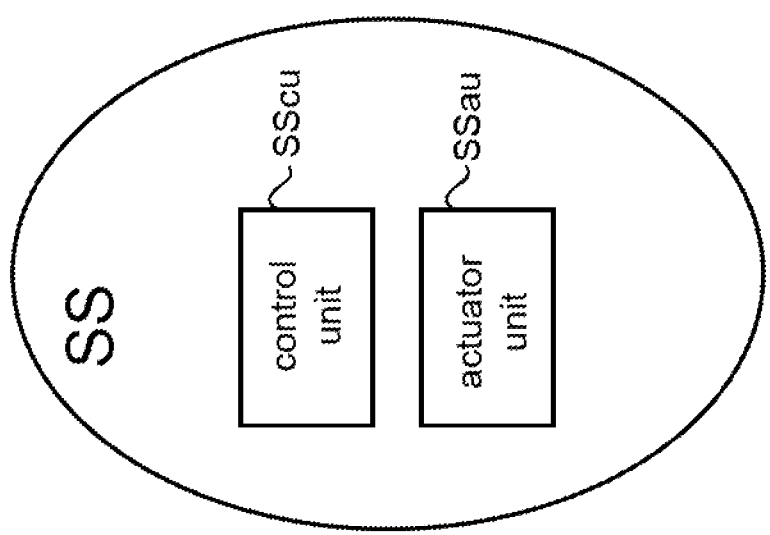
FIG. 3 is a schematic representation of an actuating system of a motor vehicle.

With respect to the data, the position sensors LS1, LS2 are coupled with an actuating system SS, which includes an actuator unit SSau and a control unit SScu, as shown in FIG. 3, particularly a processor device. Especially with respect to programming, the actuating system SS, particularly the control device, is configured such that the light distribution, particularly the low-beam light distribution, generated by the headlight, particularly the low-beam light module, is adjusted as a function of the first and second position information LI1, LI2.

Position changes, which occur as a result of a special loading or a special acceleration of the motor vehicle, are detected equally by both position sensors LS1, LS2, and may therefore not be taken into account by means of the position sensors LS1, LS2 when adjusting the light distribution.

However, in a preferred embodiment of the invention, in addition to the position sensors LS1, LS2, level sensors, which are known per se and are not shown, can be provided in the area of the forward axle and the rearward axle of the motor vehicle, in order to detect the position change of the vehicle body relative to the roadway. With respect to the data, also the level sensors are coupled with the actuating system, so that changes of the light distribution caused by position changes of the vehicle body relative to the roadway can be corrected by the actuating system.

Figure 2:
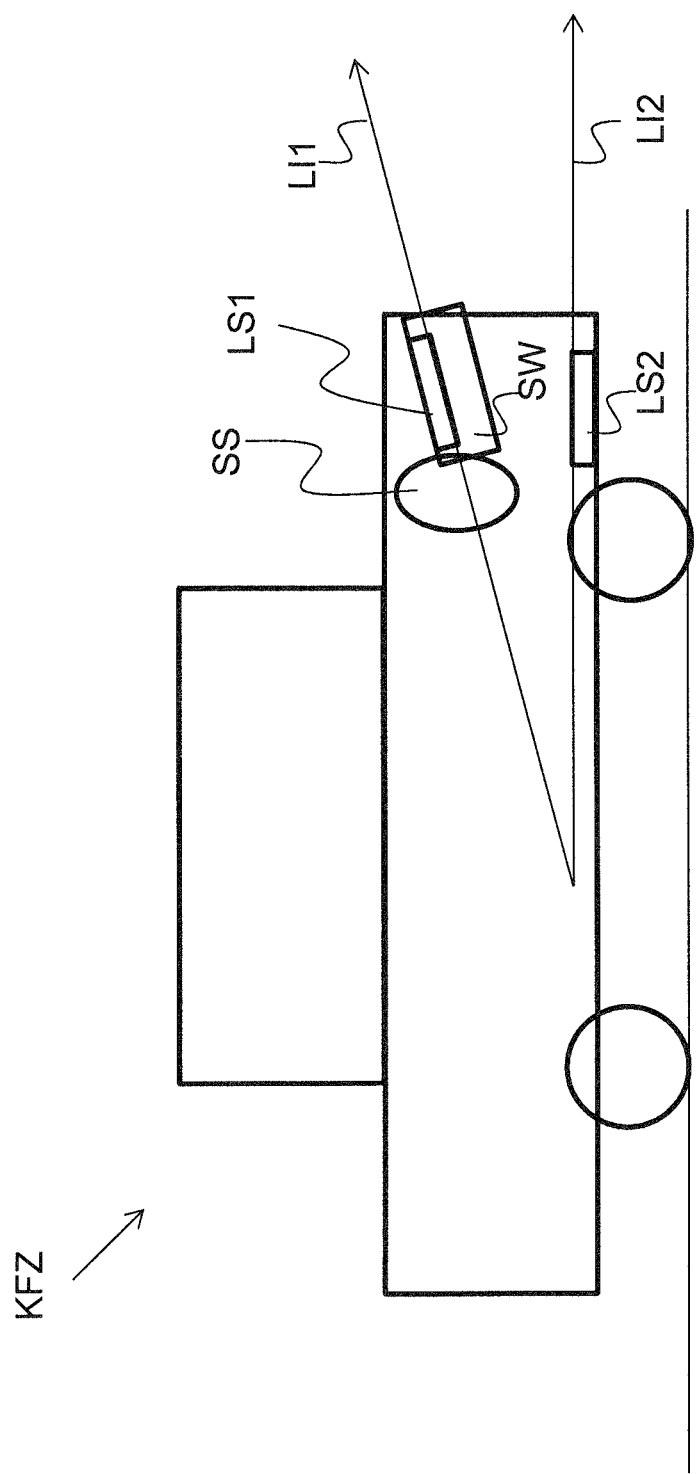
FIG. 2 is a second simplified schematic lateral function representation of a motor vehicle.

FIG. 2 schematically illustrates the motor vehicle KFZ from FIG. 1 having a headlight SW, whose position with respect to the position after the delivery, for example, because of aging influences or thermal effects, is changed such that the light distribution, particularly the low-beam light distribution, generated by the headlight, no longer corresponds to the regulations. As a result, drivers of oncoming vehicles may be blinded by the headlight.

By means of the invention, this unintended position change of the headlight SW is determined by the detection of the position change of the first position sensor LS1 relative to the position change of the second position sensor LS2 and is corrected or compensated via the actuating system SS in that the headlight SW, particularly the low-beam light module, is swiveled such that the unintended position change of the headlight SW, particularly of the low-beam light module, is reversed. The position of the headlight SW, particularly the low-beam light module, relative to the position of the vehicle body will then again correspond to the initial delivery state or another condition with a light distribution adjusted according to the regulations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a headlight having a light source;
   a first position sensor configured to output first position information associated with a position of the headlight or the light source of the headlight;
   a second position sensor configured to output second position information associated with a position of a body of the motor vehicle; and
   an actuating system arranged on or adjacent to the headlight, the actuating system comprising a control unit configured to: (i) detect a change in position of the first position sensor relative to the second position sensor based on the first position information and the second position information and (ii) adjust the headlight or the light source, thereby adjusting a light distribution generated by the headlight,
   wherein the first position sensor is arranged on the headlight, and
   the second position sensor is arranged on or carried by a vehicle body shell, a chassis, or a vehicle occupant compartment such that a position of the second position sensor relative to the vehicle body shell, the chassis or a vehicle occupant compartment is fixed, and
   wherein the first position information represents a first angle of slope and the second position information represents a second angle of slope, the first and second angle of slope being situated in a plane, which is parallel to a longitudinal axis of the motor vehicle, and which is orthogonal to a transverse axis of the motor vehicle, and
   the actuating system for adjusting a light distribution generated by the headlight as a function of the first position information and of the second position information, is configured such that a difference between the first and second angle of slope is kept constant with a tolerance of 5%.

2. The motor vehicle according to claim 1, wherein the light source is a low-beam light module.

3. The motor vehicle according to claim 1, wherein
   wherein the control unit converts the first and second position information to actuating information.

4. The motor vehicle according to claim 3, wherein
   the actuating system comprises an actuator unit that adjusts a light distribution generated by the headlight as a function of adjusting information.

5. The motor vehicle according to claim 4, wherein
   the actuator unit adjusts a low-beam light distribution generated by a low-beam light module of the headlight.

6. The motor vehicle according to claim 1, wherein
   the first position information comprises information concerning the position of the body of the motor vehicle and information concerning the position of the headlight relative to the body of the motor vehicle.

7. The motor vehicle according to claim 6, wherein
the second position information comprises information concerning the position of the body of the motor vehicle.

8. The motor vehicle according to claim 7, wherein
the second position information does not comprise information concerning the position of the headlight relative to the body of the motor vehicle.

9. The motor vehicle according to claim 1 wherein,
the actuating system for adjusting a light distribution generated by the headlight is configured such that position changes of the headlight of a reflector of a low-beam light module or of a lens of the low-beam light module, relative to the body of the motor vehicle, are reduced as a function of the first and second position information.

10. The motor vehicle according to claim 1, wherein
the first and/or the second position information contains position direction information in a plane which is parallel to a longitudinal axis of the motor vehicle and orthogonal with respect to a transverse axis of the motor vehicle.

11. A motor vehicle comprising:
a headlight having a light source;
a first position sensor configured to output first position information associated with a position of the headlight or the light source of the headlight;
a second position sensor configured to output second position information associated with a position of a body of the motor vehicle; and
an actuating system arranged on or adjacent to the headlight, the actuating system comprising a control unit configured to: (i) detect a change in position of the first position sensor relative to the second position sensor based on the first position information and the second position information and (ii) adjust the headlight or the light source, thereby adjusting a light distribution generated by the headlight, wherein
the first position sensor is arranged on the headlight, and
the second position sensor is arranged on or carried by a vehicle body shell, a chassis, or a vehicle occupant compartment, wherein
the first position information represents a first angle of slope and the second position information represents a second angle of slope, the first and second angle of slope being situated in a plane, which is parallel to a longitudinal axis of the motor vehicle, and which is orthogonal to a transverse axis of the motor vehicle, and
the actuating system for adjusting a light distribution generated by the headlight as a function of the first position information and of the second position information, is configured such that a difference between the first and second angle of slope is kept constant with a tolerance of 5%.

12. The motor vehicle according to claim 11, wherein
the position information or the first and second angle of slope are initialized when the light distribution is adjusted.

* * * * *